UNITED STATES PATENT OFFICE.

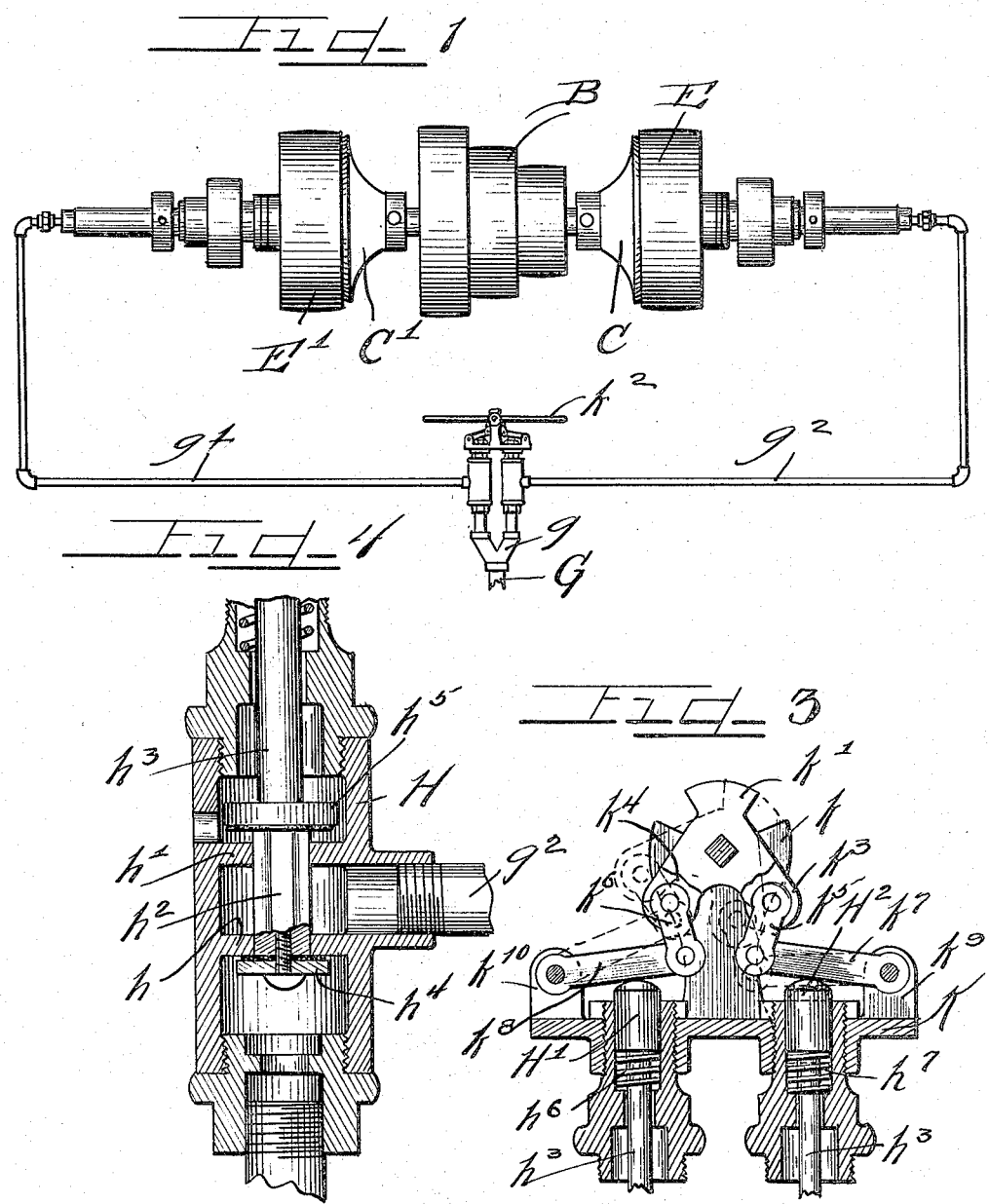

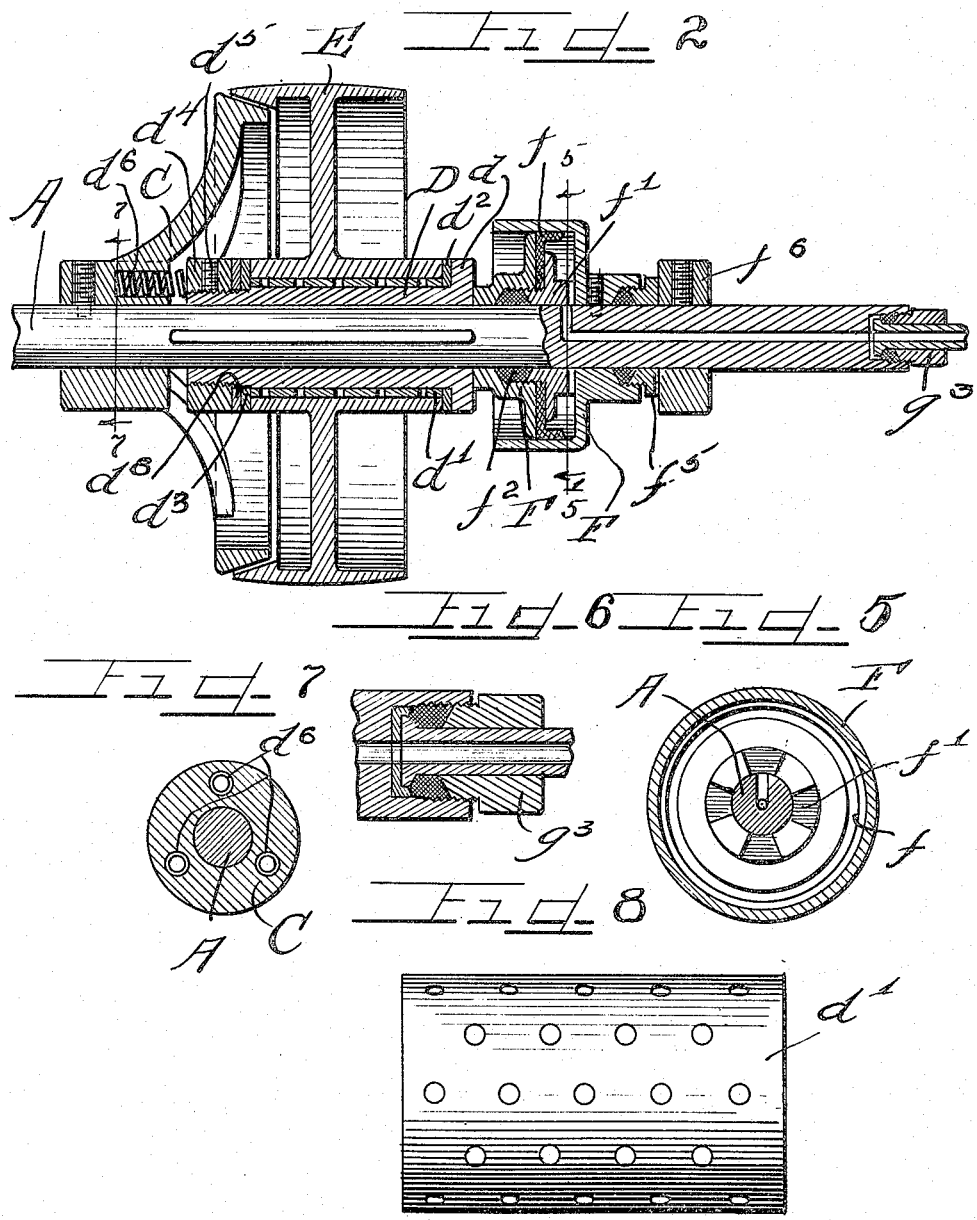

PAUL J. GREBEL, OF CHICAGO, ILLINOIS, ASSIGNOR TO MANUFACTURERS EQUIPMENT COMPANY, A CORPORATION OF ILLINOIS.

PNEUMATICALLY-OPERATED SHAFT.

942,065.

Specification of Letters Patent.

Patented Dec. 7, 1909.

Application filed February 10, 1909. Serial No. 477,182.

*To all whom it may concern:*

Be it known that I, PAUL J. GREBEL, a citizen of the United States, and a resident of the city of Chicago, in the county of Cook and State of Illinois, have invented certain new and useful Improvements in Pneumatically-Operated Shafts; and I do hereby declare that the following is a full, clear, and exact description of the same, reference being had to the accompanying drawings, and to the letters of reference marked thereon, which form a part of this specification.

The object of this invention is to afford a countershaft adapted to permit the transmission of the drive to be reversed pneumatically and instantaneously.

It is also an object of the invention to afford a construction in which driving belts to the countershaft run at all times upon loose pulleys and to afford in connection with such loose pulleys pneumatically operated clutches, one member of which comprises the loose pulley and the other member of which comprises a complemental member rigidly secured on the shaft.

It is also an object of the invention to afford an exceedingly simple, shifting or valve mechanism whereby the operator may instantaneously bring either transmission into effective operation.

The invention consists in the matters hereinafter described and more fully pointed out and defined in the appended claims.

In the drawings: Figure 1 is a side elevation of a countershaft embodying my invention and illustrating the connections therefor. Fig. 2 is an enlarged central longitudinal section of one end of the countershaft and illustrating the pneumatic mechanism and clutch. Fig. 3 is an enlarged fragmentary detail partly in section of the valve actuating mechanism. Fig. 4 is an enlarged fragmentary central section of the valve. Fig. 5 is a section on line 5—5 of Fig. 2. Fig. 6 is an enlarged fragmentary longitudinal section illustrating the connection of the pneumatic pipes with the tubular ends of the countershaft. Fig. 7 is a section on line 7—7 of Fig. 2. Fig. 8 is an enlarged side elevation of the anti-friction bushing for the loose pulley.

As shown in said drawings: A, indicates the shaft, which, as shown, is tubular for a part of its length, each end having an axial bore extending inwardly to the pneumatic actuating means, and opening outwardly through the side of the shaft, as shown in Fig. 2.

Rigidly secured on the shaft is a pulley B, which may be, of course, a simple pulley or a step cone pulley, as preferred, and from which the countershaft drives. Rigidly secured on the shaft on each side of the driving pulley B, is an outwardly facing cone friction C, C'. Feathered on said shaft beyond but adjacent to the outer face of the cone friction, is a sleeve D, threaded at its inner end, as shown in Fig. 2, and at its outer end affording an integral collar $d$. Fitted on said sleeve is an anti-friction bushing $d'$, conveniently of bearing bronze or any suitable bearing metal provided with perforations to assist in the lubrication thereof and secured between the end of said bearing sleeve $d'$, and the collar $d$, is a fiber or other suitable washer $d^2$. Bearing against the inner end of said bearing sleeve are fiber or bearing washers of any kind $d^3$—$d^3$, and threaded on the end of said sleeve is a nut $d^4$, provided also with a set screw or other locking means $d^5$, which engages therethrough and screws the same rigidly upon the threads of the sleeve.

Seated in a suitable aperture in the hub of the cone friction C, is a spring $d^6$, which bears against said nut $d^4$, and acts normally to force the sleeve out of engagement with the cone friction.

Rotatable on the bearing sleeve $d'$, and between the washers $d^2$—$d^3$, are loose belt pulleys E—E', adapted to engage the respective cone frictions C—C', and which, of necessity, being held from longitudinal movement on the sleeves D, move therewith longitudinally on the shaft when said sleeves are actuated.

Rigidly secured on the shaft beyond the sleeve D, is a cylinder F, open at its end adjacent said sleeve and in which is a piston F', slidable on said shaft and the hub of which at all times bears against the head or outer end of said sleeve D. As shown, pneumatic packing $f$, is secured against the piston head on the inner side thereof by means of a jam nut $f'$, which on its inner or hub end is threaded into a suitable recess in the piston, as shown in Fig. 2, said recess containing packing material $f^2$, which affords a gland. The hub of the nut $f'$, is provided with radial passages of comparatively large size to permit of ready access of the pressure fluid therethrough into the cylinder, and as shown, the ports through said nut are so disposed as to afford a very small clearance on the passage or port through the shaft when the piston is at the forward limit of its travel, as shown in Fig. 2.

The hub of the cylinder is provided with a recess adapted to contain packing and is internally threaded to receive the follower nut $f^5$, therein, thereby affording a gland, and rigidly engaged on the shaft and adapted to be set up against said follower nut to hold the same at all times in adjustment is a collar $f^6$.

A suitable actuating valve is provided whereby the pressure may be admitted to either cylinder from a suitable pressure supply pipe G, which, of course, may supply either compressed air or steam for the purpose of actuating either piston. As shown, a Y fitting $g$, is connected in the main supply pipe G, and connected on each branch of the Y, is a piston valve, one of which connects through a suitable pipe $g'$, with the bore in one end of the countershaft, and the other $g^2$, connects with the opposite end thereof, said connection being made through a gland $g^3$, in each end of the shaft, which may be of any suitable or desired construction. Each of said valves, as shown, consists of a casing H, the bottom of which is threaded upon the suitable branch of the Y, and from the side of the casing extends the pressure pipe $g'$ or $g^2$, as the case may be.

Above and below the pressure pipe are transverse walls $h$—$h'$, each apertured to receive therethrough the fluted end $h^2$, of the valve stem $h^3$, on which, as shown, on the outer side of the partitions $h$—$h'$, are the valve and closures $h^4$—$h^5$, each on the side adjacent the partition provided with suitable packing and adapted to close or seat tightly thereon when shifted in either direction. As shown, from the chamber above the partition or seat $h'$, said casing is ported to the atmosphere. Said stems extend outwardly beyond the respective casings and are provided for the respective valves with an outwardly extending rounded head H'—H², beneath which engage springs $h^6$—$h^7$, respectively, which act to hold said stems in position for the closure $h^4$, to seat on the partition $h$, thereby cutting off the pressure from both pressure pipes $g'$—$g^2$, as shown in Figs. 1, 3 and 4. Means are provided for actuating said valves selectively. For this purpose, as shown, a frame K, is secured upon the upper end of each valve casing provided with an upwardly directed bracket arm $k$, on which is journaled a plate $k'$, through the top of which extends a rod $k^2$, whereby said plate may be swung toward or from either valve and extending below the pivot therefor are downwardly directed arms $k^3$—$k^4$, on which are pivotally connected links $k^5$—$k^6$, respectively which at their ends pivotally engage toggle bars $k^7$—$k^8$, which are respectively connected at their outer ends with lugs $k^9$—$k^{10}$, on the ends of said frame. Said links $k^5$—$k^6$, are of a length together with the toggle bars $k^7$—$k^8$, that when said plate is shifted in one direction to depress the corresponding valve stem, the pivot connection for said link with the arm for said plate is carried beyond the fulcrum point or pivotal connection of said link with the toggle bar, in consequence the adjustment is maintained by the outward pressure of the spring on the stem, as shown in dotted lines in Fig. 3.

The operation is as follows: By shifting the actuating lever and plate in either direction the appropriate valve stem is depressed, opening the lower valve in the casing and closing the upper and permitting the pressure to flow through the supply pipe to the appropriate end of the shaft and thence through the ports in the hub of the piston into the cylinder, forcing the piston and loose pulley longitudinally of the shaft and by engaging the loose pulley upon the conical friction driving the shaft from said pulley. Obviously in actuating one valve to admit the flow therethrough to the relative cylinder the stem of the other valve is released. This, however, is unimportant for in neutral position the closure $h^4$, for that valve is positively seated to close the lower valve in said casing. In consequence, any air in the cylinder not receiving the pressure returns through the pipe and vents to the atmosphere from the upper part of the valve casing. By shifting the valve in the opposite direction the cylinder previously under pressure is vented and the pressure is delivered into the opposite cylinder where the pulley E', driven, we may assume, by a twist belt or in any suitable manner reversely from the pulley E, is engaged upon the friction cone and in consequence the drive of the shaft is reversed.

Of course, I am aware that many different forms or types of valves may be employed for controlling and directing the flow of pressure as desired, and I am aware too, that many details of the pneumatic construction in other respects may be varied without departing from the principles of this invention. I therefore do not purpose limiting this application for patent otherwise than necessitated by the prior art.

I claim as my invention:

1. The combination with a shaft axially bored from its ends inwardly and ported through the side thereof, of inwardly facing cylinders open at their inner ends and rigidly secured on the shaft to receive the pressure from the port therein, pistons slidable in the cylinders, a fixed pulley on the shaft, outwardly facing friction cones rigidly secured on the shaft, slidable loose pulleys engaged on the shaft and having the faces adjacent the cones complemental therewith, the hubs of said loose pulleys bearing against the pistons and suitable connections to admit pressure into the appropriate cylinder to actuate the piston to force the appropriate loose pulley upon its cone.

2. The combination with a shaft of a driving pulley thereon, outwardly facing friction elements on each side thereof, sleeves slidable on the shaft, loose pulleys journaled on said sleeves, one adjacent each of said friction elements, inwardly facing cylinders rigidly secured on the shaft, one on the outer side of each loose pulley, pneumatically operated pistons slidable in the cylinders, one bearing against each sleeve, pressure pipes connected to supply pressure into the cylinders to actuate said pistons and valves connected in the pressure pipes and adapted to admit pressure to selectively actuate the pistons.

3. In a device of the class described a shaft, cylinders thereon, pistons in said cylinders, sleeves slidable on said shaft against each of which one of the pistons bear, loose pulleys rotatably engaged on the sleeves and slidable therewith, said loose pulleys having friction faces, friction members rigidly secured to the shaft adapted to be engaged by the friction faces of the loose pulleys, a pulley rigidly secured to the shaft and means for admitting pressure into either cylinder.

4. A reversible countershaft embracing a shaft, a driving pulley thereon, outwardly facing friction elements on each side thereof, sleeves on the shaft, one slidable between the driving pulley and each friction element, loose pulleys journaled on said sleeves and held from longitudinal movement relatively of the sleeves and adapted by the sliding of the sleeves to engage the friction elements, and pneumatically operated pistons slidable on the shaft adapted to adjust the loose pulleys to engage the friction elements.

5. The combination with a shaft axially bored from its ends inwardly and ported through the side thereof, of inwardly facing cylinders open at their inner ends and rigidly secured on the shaft to receive the pressure from the port therein, pistons slidable in said cylinders, a member secured to each piston having radial slots adapted to admit the pressure into the cylinder and to prevent the piston closing the port in the shaft, a fixed pulley on the shaft, friction members on the shaft, pulleys on the shaft having friction faces complemental with the friction members, and suitable connections to admit pressure into said cylinders to actuate the pistons.

6. In a device of the class described a shaft having an axial passage at each end, cylinders on the shaft, one communicating with each passage, a piston in each cylinder, means secured to each piston to prevent the piston cutting off communication between the shaft, and the respective cylinder, sleeves on the shaft, one actuated by each piston, a loose pulley journaled on each sleeve, a friction element for engagement by each pulley, a driving pulley on the shaft between the friction elements, a pressure pipe axially connected with each end of the shaft by means of a gland forming an air tight swivel connection.

7. In a device of the class described a shaft, a pulley rigidly secured thereon, a friction member rigidly secured on each side of the pulley, a friction pulley for each friction member adjustable inwardly to engage the same and independently operating pneumatic means for adjusting each friction pulley inwardly to engage the respective friction member.

8. In a device of the class described a shaft, a pulley rigidly secured thereon, a friction member rigidly secured on each side of the pulley, a friction pulley for each friction member adjustable inwardly to engage the same, independently operating pneumatic means for adjusting each friction pulley inwardly to engage the respective friction member, and springs for forcing each friction pulley to disengage its friction member.

9. In a device of the class described a shaft, a drive pulley rigidly secured thereon, friction members rigidly secured on the shaft, one on each side of the drive pulley, pulleys on the shaft adjustable to engage the friction members, anti-friction bearing sleeves for the pulleys and sleeves adapted to receive the bearing sleeves and the adjustable pulleys thereon and longitudinally movable on the shaft to adjust the pulleys.

10. In a device of the class described a shaft, a drive pulley rigidly secured thereon, friction members rigidly secured on the shaft, one on each side of the drive pulley, pulleys on the shaft adjustable to engage the friction members, anti-friction bearing sleeves for the pulleys, sleeves adapted to receive the bearing sleeves and the adjustable pulleys thereon and longitudinally movable on the shaft to adjust the pulleys, a pneumatic adjusting mechanism at each end of the shaft for longitudinally moving the appropriate sleeve to adjust the pulley into engagement with the proper friction member.

11. In a device of the class described a shaft, a rigid pulley thereon, coacting friction elements on the shaft on each side of the pulley, one element rigidly secured on the shaft and the other element adjustable to engage and disengage the rigid element and an independent pneumatically operated mechanism for adjusting each set of friction elements into engagement.

12. In a device of the class described a shaft, a rigid pulley thereon, coacting friction elements on the shaft on each side of the pulley, one element rigidly secured on the shaft and the other element adjustable to engage and disengage the rigid element, an independent pneumatically operated mechanism for adjusting each set of friction elements into engagement, and mechanism other than the pneumatically operated mechanism for automatically shifting each set of coacting friction elements out of engagement.

13. In a device of the class described a shaft, a stepped pulley rigidly secured thereon, coacting friction elements on the shaft on each side of the pulley, one element of each set being rigid on the shaft and the other element loose on the shaft and adjustable longitudinally, a cylinder at each end of the shaft, a piston in each cylinder adapted to actuate the longitudinally adjustable element and means for independently admitting pressure into the cylinders.

14. In a device of the class described a shaft, a stepped pulley rigidly secured thereon, coacting friction elements on the shaft on each side of the pulley, one element of each set being rigid on the shaft and the other element loose on the shaft and adjustable longitudinally, a cylinder at each end of the shaft, a piston in each cylinder adapted to actuate the longitudinally adjustable element to engage the rigid element, means for independently admitting pressure into the cylinders and springs fitting in recesses in one of each pair of coacting friction elements and bearing on the other element of the pair adapted to automatically adjust the loose element longitudinally of the shaft.

In testimony whereof I have hereunto subscribed my name in the presence of two subscribing witnesses.

PAUL J. GREBEL.

Witnesses:
C. W. HILLS,
LAWRENCE REIBSTEIN.